(12) United States Patent  (10) Patent No.: US 7,433,776 B1
Hunter et al.  (45) Date of Patent: Oct. 7, 2008

(54) SYSTEM AND METHOD FOR QUANTIZING FUEL DILUTION OF ENGINE MOTOR DUE TO POST-INJECTION FUELING TO REGENERATE AN EXHAUST AFTERTREATMENT DEVICE

(75) Inventors: Gary L. Hunter, Elburn, IL (US); Andrei Makartchouk, Lombard, IL (US)

(73) Assignee: International Engine Intellecutal Property Company, LLC, Warrenville, IL (US)

( * ) Notice: Subject to any disclaimer, the term of this patent is extended or adjusted under 35 U.S.C. 154(b) by 0 days.

(21) Appl. No.: 11/736,879

(22) Filed: Apr. 18, 2007

(51) Int. Cl.
*F02D 41/00* (2006.01)

(52) U.S. Cl. .................. 701/102; 123/568.22; 60/295

(58) Field of Classification Search ......... 701/102–103, 701/114; 60/285, 286, 295, 301; 123/196 AB, 123/196 CF, 678–682, 568.22, 568.31
See application file for complete search history.

(56) References Cited

U.S. PATENT DOCUMENTS

| 6,718,946 | B2* | 4/2004 | Hokazono et al. ........... 123/445 |
| 6,823,834 | B2* | 11/2004 | Benson et al. .............. 123/299 |
| 7,043,903 | B2* | 5/2006 | Onodera et al. .............. 60/295 |
| 7,331,171 | B2* | 2/2008 | Chiba et al. .................. 60/286 |
| 2007/0044781 | A1* | 3/2007 | Nakayama et al. .......... 123/704 |

* cited by examiner

*Primary Examiner*—Willis R. Wolfe, Jr.
*Assistant Examiner*—Johnny H. Hoang
(74) *Attorney, Agent, or Firm*—Jake D. Nimz; Jeffrey P. Calfa

(57) ABSTRACT

A system and method for estimating the effect of forced regeneration of a diesel particulate filter (22) by post-injection of fuel on fuel dilution of engine motor oil.

8 Claims, 5 Drawing Sheets

SYSTEM AND METHOD FOR QUANTIZING FUEL DILUTION OF ENGINE MOTOR DUE TO POST-INJECTION FUELING TO REGENERATE AN EXHAUST AFTERTREATMENT DEVICE

FIELD OF THE INVENTION

This invention relates generally to motor vehicles, such as trucks, that are powered by internal combustion engines, particularly diesel engines that have certain exhaust gas treatment devices for treating exhaust gases passing through their exhaust systems. The invention especially relates to a system and method for quantizing the dilution of engine motor oil due to the use of post-injection of fuel to regenerate an exhaust aftertreatment device.

BACKGROUND OF THE INVENTION

Known systems and methods for indicating when the motor oil that lubricates moving internal parts of an engine needs to be changed are commonly based on elapse of time and/or miles traveled after the immediately previous oil change. The lengths of time and/or of mileage may be based on data developed through prior studies of the effect of vehicle operation on motor oil lubricating quality.

U.S. Pat. No. 6,513,367 mentions other known systems and methods. One involves using a dielectric sensor to monitor the quality of motor oil. Another involves estimating oil quality by tracking vehicle operation after the most recent addition of fresh motor oil. That patent also identifies various factors that contribute to contamination of engine motor oil.

One of those factors is soot created by combustion of fuel in the engine. The patent describes a sophisticated algorithm for estimating the amount of soot added to the motor oil by each combustion event in each cylinder. Specifically, soot addition is estimated as a function of fuel flow, load, coolant temperature, and an injection timing factor. When the quality of the oil has deteriorated to some defined extent suggesting that the oil be changed, a signal to that effect is given.

Certain engines, diesel engines especially, may have one or more aftertreatment devices in their exhaust systems for removing undesired materials from engine exhaust so that those materials don't enter the atmosphere. Such devices may at times require regeneration. As used here, "regeneration" of an aftertreatment device applies to any aftertreatment device that on occasion requires a specific cylinder combustion event that creates additional soot, HC, and the like in order to maintain effectiveness of the aftertreatment device.

One such device is a diesel particulate filter (DPF) that traps certain particulates in the exhaust. A DPF requires regeneration from time to time in order to maintain particulate trapping efficiency. Regeneration as applied to a DPF involves the presence of conditions that will burn off trapped particulates whose unchecked accumulation would otherwise impair DPF effectiveness. While "regeneration" of a DPF often refers to the general process of burning off DPM from a DPF, two particular types of DPF regeneration are recognized by those familiar with DPF regeneration technology as presently being applied to motor vehicle engines.

"Passive regeneration" is generally understood to mean regeneration that can occur anytime that the engine is operating under conditions that burn off DPM without having been initiated by a specific regeneration strategy embodied by algorithms in an engine control system. "Active regeneration" is generally understood to mean regeneration that is initiated intentionally, either by the engine control system on its own initiative, or by the driver causing the engine control system to initiate a regeneration, with the goal of elevating temperature of exhaust gases entering the DPF to a range suitable for initiating and maintaining burning of trapped particulates.

Active regeneration may be initiated before a DPF becomes loaded with DPM to an extent where regeneration would be mandated by the engine control system on its own due to the amount of DPM loading.

The creation of conditions for initiating and continuing active regeneration, whether forced by the control system on its on or by driver action, generally involves elevating the temperature of exhaust gas entering the DPF to a suitably high temperature to initiate and continue burning of trapped particulates. Because a diesel engine typically runs relatively cool and lean, the post-injection of diesel fuel is one technique used as part of a regeneration strategy to elevate exhaust gas temperatures entering the DPF while still leaving excess oxygen for burning the trapped particulate matter. Post-injection may be used in conjunction with other procedures and/or devices, a diesel oxidation catalyst ahead of the DPF for example, for elevating exhaust gas temperature to the relatively high temperatures needed for active DPF regeneration.

The post-injection of fuel for DPF regeneration however inherently creates certain additional exhaust constituents, including an excess of unburned fuel, to be exhausted from each combustion chamber. Hence, active regeneration of a DPF, even if only occasional, creates an additional contamination component in the exhaust created within the engine combustion chambers. Particulate filters used to reduce particulate emissions from diesel engines require periods of time at sufficient temperature to regenerate or burn off the collect soot. If the vehicle/engine duty cycle doesn't provide for the required particulate filter inlet temperature to be attained periodically, an alternate means of sufficient increase in filter inlet temperature must be employed. One such means is to use additional in-cylinder fuel injection pulse(s) late in the expansion stroke to provide a source of unburned fuel to the exhaust gas. This unburned fuel is then oxidized in an oxidation catalyst, causing a temperature increase in the exhaust gas entering the particulate trap sufficient to initiate regeneration.

In some cases the use of post injection can result in fuel deposition on the cylinder wall, ultimately leading to fuel dilution of the lubricating oil. This dilution results in lower viscosity and other property changes of the lubricating oil, reducing its effectiveness.

SUMMARY OF THE INVENTION

The present invention is directed toward a strategy that specifically takes active regeneration of a DPF into account when calculating quality of engine motor oil.

One general aspect of the invention relates to a method for quantizing fuel dilution of a supply of engine motor oil in a lubrication system of an internal combustion engine due to post-injection of fuel into a cylinder of the engine that occurs after a main injection to create rich exhaust leaving the cylinder.

A data processing system associated with the engine executes an algorithm for a) calculating a quantity of post-injected fuel that is retained in a film of engine motor oil on a wall of the cylinder and that, as a consequence of such retention and continuing operation of the engine, is returned to the engine motor oil supply, the algorithm comprising processing various data including data indicative of the quantity of post-injected fuel, data indicative of in-cylinder pressure at some point in the engine cycle that bears on the quantity of post-injected fuel retained in the film, data indicative of in-cylinder temperature at some point in the engine cycle that bears on the quantity of post-injected fuel retained in the film, and data indicative of engine speed, and b) using the calculated quantity of post-injected fuel that is retained in the film to quantize fuel dilution of the engine motor oil supply.

Another generic aspect relates to an algorithm for calculating a quantity of post-injected fuel that is retained in a film of engine motor oil on a wall of a cylinder of an internal combustion engine into which fuel is injected and that, as a consequence of such retention and continuing operation of the engine, is returned to a supply of engine motor oil in a lubrication system of the engine.

The algorithm comprises processing various data including data indicative of engine speed, data indicative of in-cylinder pressure at some point in the engine cycle bearing on the quantity of post-injected fuel retained in the film of engine motor oil that is returned to the engine motor oil supply, data indicative of in-cylinder temperature at some point in the engine cycle bearing on the quantity of post-injected fuel retained in the film of engine motor oil that is returned to the engine motor oil supply, and data indicative of the quantity of post-injected fuel.

A further generic aspect relates to a method for estimating degradation of engine motor oil viscosity that occurs over time with running of an internal combustion engine having a lubrication system containing a supply of engine motor oil and cylinders into which fuel is introduced and combusted to run the engine.

A data processing system associated with the engine executes an algorithm for a) calculating quantities of fuel retained in films of engine motor oil on walls of the cylinders as the engine operates and subsequently returned to the engine motor oil supply, by processing, in accordance with the algorithm, various data including data indicative of engine speed, data indicative of in-cylinder pressure at some point in the engine cycle that bears on the quantity of post-injected fuel retained in the film that is returned to the engine motor oil supply, data indicative of in-cylinder temperature at some point in the engine cycle that bears on the quantity of post-injected fuel retained in the film that is returned to the engine motor oil supply, and data indicative of quantities of fuel introduced into the cylinders, and b) using the calculated quantities of fuel retained in films of engine motor oil on walls of the cylinders as the engine operates and subsequently returned to the engine motor oil supply in processing that estimates degradation of engine motor oil viscosity.

A further generic aspect relates to an internal combustion engine comprising combustion chambers in which fuel is combusted to run the engine, a lubrication system that contains a supply of engine motor oil and through which engine motor oil from the supply is circulated to lubricate moving internal parts of the engine, and a data processing system for developing a data estimate of degradation of viscosity of the engine motor oil that occurs over time as the engine runs.

When executed, the algorithm a) calculates quantities of fuel retained in films of engine motor oil on walls of the combustion chambers as the engine operates and subsequently returned to the engine motor oil supply, by processing, in accordance with the algorithm, various data including data indicative of engine speed, data indicative of combustion chamber pressure at some point in the engine cycle that bears on quantities of fuel retained in engine motor oil films on the combustion chamber walls, data indicative of combustion chamber temperature at some point in the engine cycle that bears on quantities of fuel retained in engine motor oil films on the combustion chamber walls, and data indicative of quantities of fuel introduced into the combustion chambers, and b) uses the calculated quantities of fuel retained in engine motor oil films on the combustion chamber walls and subsequently returned to the engine motor oil supply in processing that develops a data estimate of degradation of viscosity of the engine motor oil.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
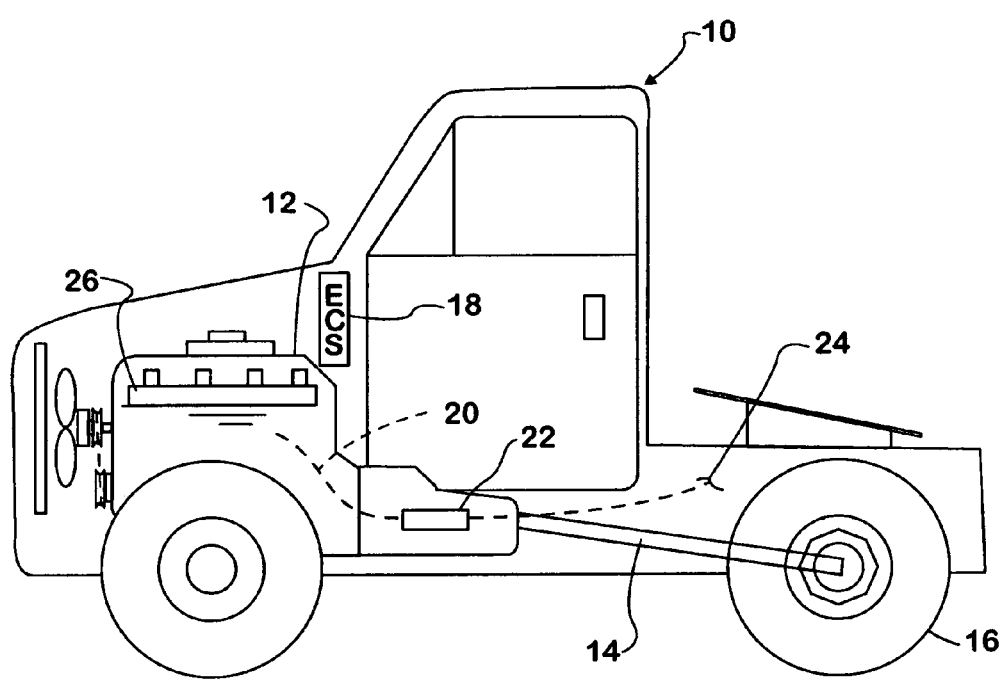
FIG. 1 is an illustration of a representative motor vehicle powered by a diesel engine.

FIG. 1 shows a truck 10 having a diesel engine 12 and a drivetrain 14 that couples the engine to driven wheels 16 for propelling the truck. Engine 12 has an associated processor that is part of an engine control system (ECS) 18 and that processes data from various sources to develop various control data for controlling various aspects of engine operation and for developing information related to operation of engine 12.

Engine 12 also has an exhaust system 20 for conveying exhaust gases generated by combustion of fuel in cylinders of engine 12 from the engine to the surrounding atmosphere. Exhaust system 20 contains one or more after-treatment devices, one of which is a diesel particulate filter (DPF) 22, for treating exhaust gases before they pass into the atmosphere via a tailpipe 24.

A fueling system 26 fuels the engine by injecting diesel fuel into the engine cylinders where the fuel combusts to run the engine.

Engine 12 also has a lubrication system that contains a supply of engine motor oil in an oil sump. Some parts of the engine kinematic mechanism may be lubricated because they are exposed directly to sump oil while other moving parts may be lubricated by circulating oil that is pumped through passageways and galleries from the sump.

When the vehicle/engine duty cycle doesn't provide a sufficient amount of passive regeneration of DPF 22, regeneration must be forced. One method for elevating exhaust temperature at the DPF inlet to force regeneration comprises post-injection of fuel by one or more fuel injection pulse(s) after the main fuel charge has combusted at or near top dead center (TDC) in the engine cycle, such as later in the expansion stroke, to provide an excess of unburned fuel and oxygen in the exhaust leaving the cylinders. This unburned fuel is then oxidized in an oxidation catalyst, causing an increase in temperature of exhaust entering the DPF sufficiently large to initiate DPF regeneration.

In some cases the use of post-injection can result in fuel deposition on the cylinder wall, ultimately leading to fuel dilution of the engine motor oil. This dilution results in lower viscosity and other changes that can affect the lubricating properties of the oil.

Figure 4:
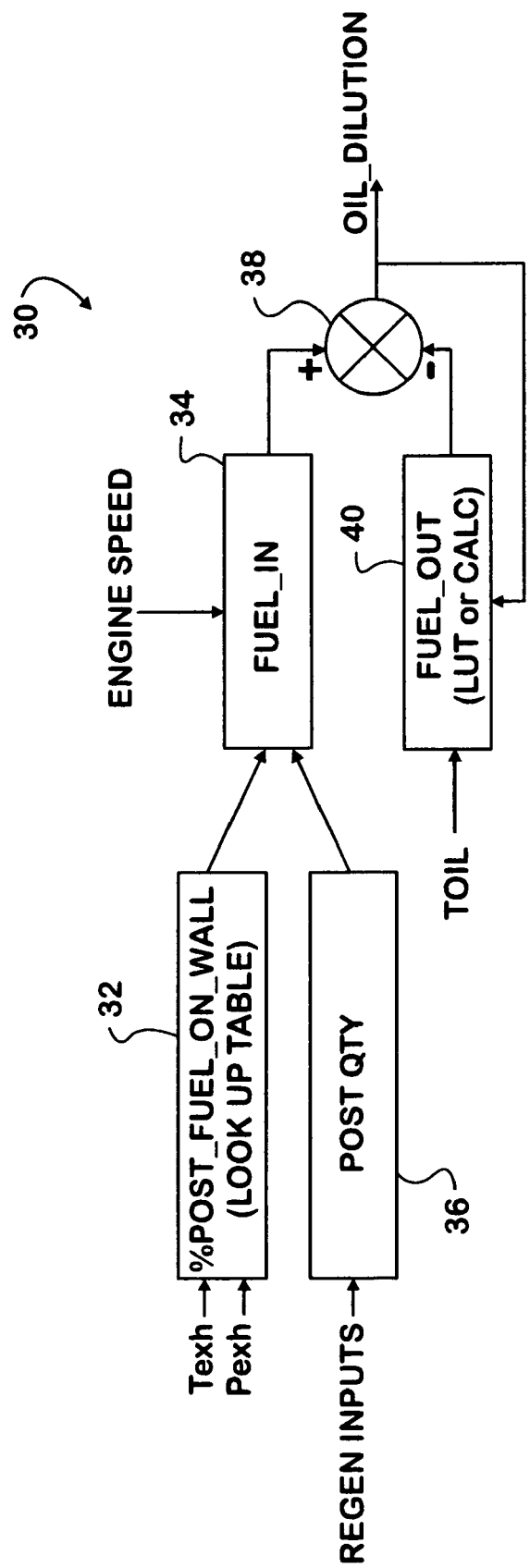
FIG. 4 is a block diagram representing an algorithm embodying principles of the invention.

The diagram of FIG. 4 illustrates steps that are embodied in an algorithm 30 in the processor of ECS 18 for calculating fuel dilution of the engine motor oil supply due to post-injection fueling that is used to regenerate DPF 22. When a regeneration of DPF 22 is requested, post-injections of fuel commence and algorithm 30 begins to iterate.

The algorithm executes a spray-model-based calculation that predicts a quantity of post-injection fuel that is transported into the oil sump by motor oil from the cylinder walls. Evaporative fuel lost is also modeled. The difference between the two represents an estimate of fuel added to the oil supply in the lubrication system.

Because calculations are made at different points in time which may not necessarily be precisely periodic, each calculation may be processed as a rate that is integrated over the ensuing time interval until the next iteration of the algorithm. If the algorithm iterates at precisely periodic intervals, then the calculations can simply be accumulated as a total that represents an estimate of the amount of fuel that is diluting the oil supply. When the dilution reaches a point that is deemed to indicate incipient impairment of the lubricating quality of the oil, a signal is given.

The spray model used to calculate the quantity of fuel retained in oil on the cylinder walls is based on known geometric parameters such as nozzle geometry and engine geometry, post-injection parameters available from the control strategy such as post-injection pressure and post-injection quantity, and engine operating parameters such as engine speed, cylinder pressure, and cylinder temperature. Engine speed is typically measured directly and published as such on a data link. Cylinder pressure and temperature can be inferred from exhaust manifold pressure and exhaust manifold temperature, which can themselves be measured or inferred.

The vaporization model used to calculate evaporative fuel is based on the existing estimate of fuel diluting the oil supply and the oil supply temperature.

FIG. 4 shows exhaust temperature Texh and exhaust pressure Pexh being processed by algorithm 30 to select from a look-up table 32, a data value correlated with values for Texh and Pexh. Texh and Pexh can be measured in the exhaust system at any suitable location that is downstream of the cylinders and upstream of a turbocharger turbine in which pressure and temperature are lost due to expansion. (Diesel engines manufactured today typically are turbocharged.) In-cylinder temperature and in-cylinder pressure correlate with Texh and Pexh, and so values for the latter two can be considered representative of values for the former two for purposes of the algorithm. Alternatively, direct measurement of in-cylinder parameters could be obtained from one or more cylinder pressure sensors and cylinder temperature sensors. Because in-cylinder pressure and temperature change significantly during the expansion downstroke, any direct measurement needs to be taken at an appropriate time in the downstroke.

Figure 3:
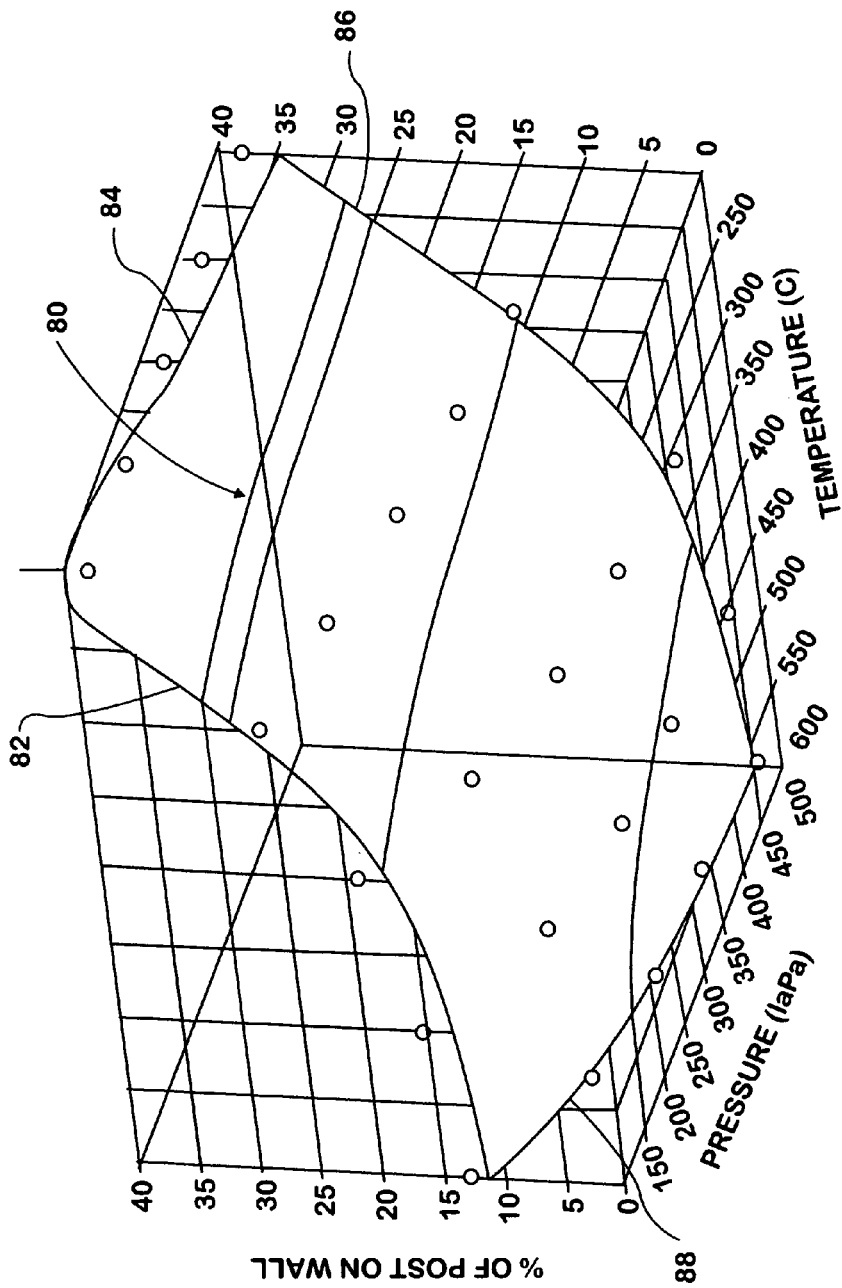
FIG. 3 is a three dimensional graph plot showing certain relationships relevant to principles of the invention.

Look-up table 32 is populated with data values in accordance with a function shown for purposes of illustration in FIG. 3 as a continuous imaginary surface 80 within a three-dimensional reference system. The two orthogonal horizontal axes represent exhaust pressure and exhaust temperature in units appropriate to the location at which the pressure and temperature are measured or inferred, such as explained above. The vertical axis represents a percentage of post-injected fuel that is retained in the oil film on a cylinder wall, and as can be appreciated, the percentage is a function of both pressure and temperature. Surface 80 is bounded by edges 82, 84, 86, and 88 that lie substantially in respective vertical planes, as shown.

Each data value in table 32 representing percentage of post-injected fuel retained in oil film on a cylinder wall correlates both with a corresponding fractional span of the pressure range and with a corresponding fraction span of the temperature range. Consequently, it can be understood that the algorithm will determine within which pressure span and temperature span the measured pressure and temperature values fall, and then select the data value for percentage of retained post-injected fuel that correlates with those spans. The selected data value is further processed by a step 34 to calculate a data value for a parameter Fuel_In.

Post-injections of fuel are quantized by a step 36, and the quantized data value is also processed by step 34. Engine speed data is also processed by step 34. The data vale for Fuel_In calculated during each iteration of algorithm 30 represents a quantity of fuel retained in oil on the cylinder walls that is being transferred to the oil supply. That data value is an input to an algebraic summing function 38.

A second input to function 38 is the data value for a parameter Fuel_Out calculated by a processing step 40. Step 40 utilizes a modeled correlation function that correlates fuel evaporation from the engine motor oil supply with engine motor oil temperature at a location where oil temperature is sensed to reflect temperature of oil in the sump. Fuel retained in oil in the sump is still volatile and as oil temperature increases, some of the fuel will vaporize at a rate correlated with temperature. Hence, step 40 quantizes evaporative fuel loss, and with each iteration of the algorithm, function 38 subtracts the evaporative fuel loss from the oil supply from the post-injected fuel being added to the oil supply. This typically yields a net addition of fuel to the oil. Fuel continues to evaporate after post-injection ceases, and so the evaporation model continues to be applied.

Figure 5:
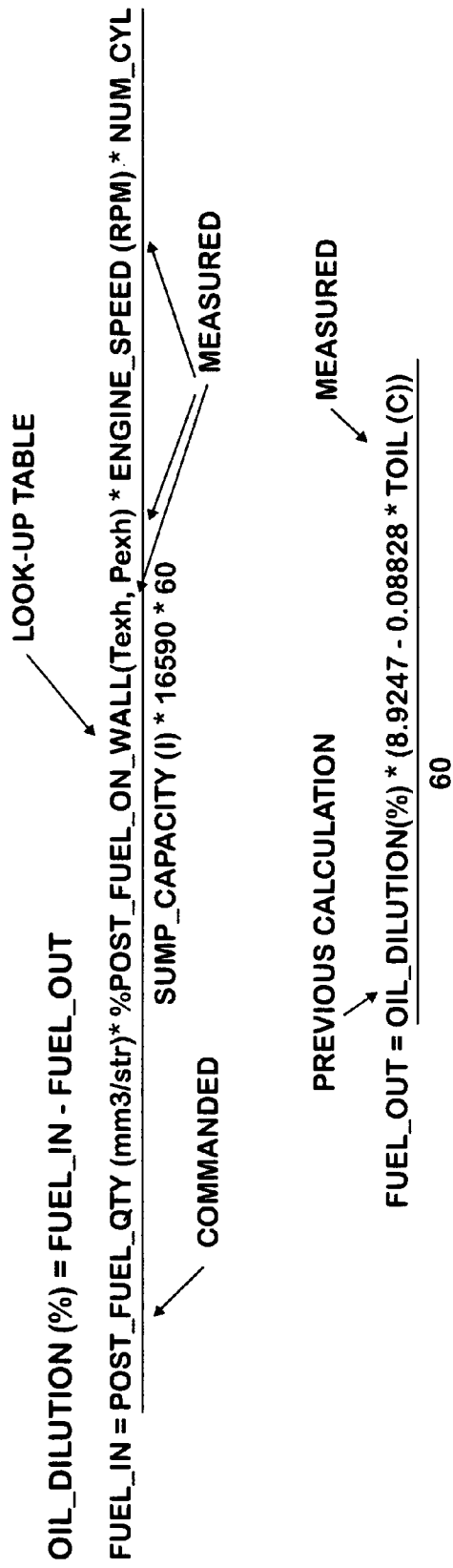
FIG. 5 is a mathematical expression of the algorithm.

Algorithm 30 is mathematically expressed by FIG. 5. Fuel_In is the processing result of step 34. Fuel_Out is the processing result of step 40. Post_Fuel_Qty is the data value for quantized fuel calculated by step 36. %Post_Fuel_On_Wall is the data value selected from look-up table 32. Num_Cyl is the number of cylinders. Sump_Capacity is the amount of oil nominally in the lubrication system. Toil is the temperature of oil in the sump. Oil Dilution(%) used in calculating Fuel_Out is the difference between Fuel_In and Fuel_Out from the previous calculation of the difference. Each time the algorithm iterates, the calculated difference is added to an accumulation of the prior differences, or integrated, as explained above, so that the accumulation reflects the current estimate of how diluted the oil has become.

Figure 2:
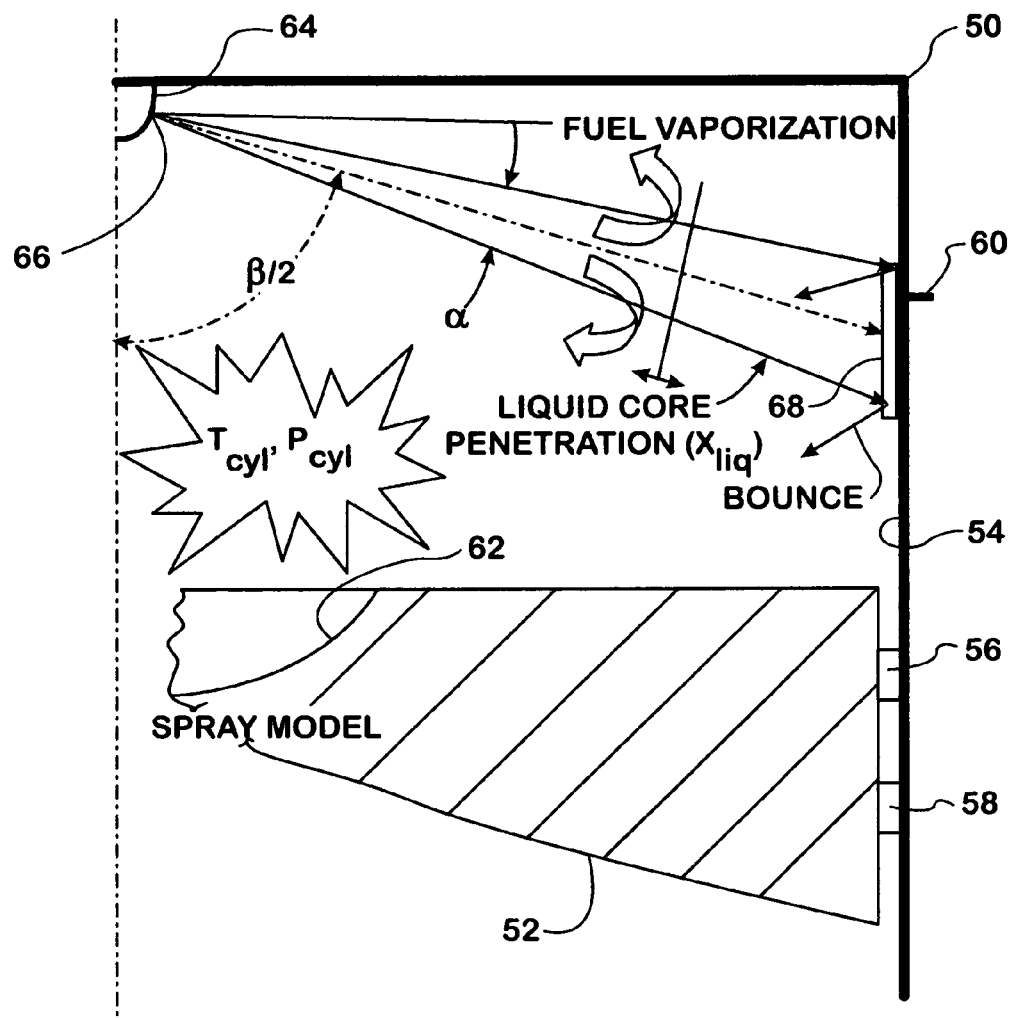
FIG. 2 is a partial half-section diagram of a cylinder of the diesel engine.

FIG. 2 shows how an engine cylinder 50 is modeled for purposes of calculating the quantities of fuel retained in oil on the cylinder wall 54, which is typically lined. As engine 12 runs, a piston 52 reciprocates within cylinder 50. Piston rings 56, 58 provide a seal of the side of the piston head to wall 54, with motor oil providing lubrication. The reference 60 designates the point at which ring 56 reverses travel, i.e. TDC. With the piston at or very near TDC, the bowl 62 of piston 52 is positioned generally in the path of fuel injected from the tip 64 of a fuel injector through an orifice 66, resulting in main combustion and downstroking of the piston as the hot gas expands.

When the cycle includes a post-injection phase, one or more post-injection pulses occur later in the expansion downstroke. The position of piston 52 shown in FIG. 2 is representative of that phase. It can be seen that the spray angle of the injected fuel pulses β/2 that is appropriate for main combustion at TDC no longer intersects the piston. Consequently, the widening fuel spray cone (angle α) is directed toward a zone 68 on wall 54. Some of the fuel in the spray cone does evaporate, but a residual liquid core strikes the wall. Some of that liquid is retained in the oil on the wall and eventually is returned to the oil sump thereby diluting the oil supply. The remainder bounces off the wall. Depending on engine speed, the velocity of the spray can cause liquid to traverse a cylinder up to several times before vaporizing and finally exiting the cylinder through one or more open exhaust valves.

Because the inventors have discovered that the particular operating parameters processed by the algorithm have dominant influence on the calculation and reflect influence of other parameters on fuel dilution, the use of other operating parameters such as injection pressure need not necessarily be used. The design parameters in the mathematical expression of FIG. 5 are ones of dominant importance, and the effect of other parameters such as injector nozzle diameter, included angle of spray, and cylinder bore are generalized in FIG. 3.

While a presently preferred embodiment of the invention has been illustrated and described, it should be appreciated that principles of the invention apply to all embodiments falling within the scope of the invention defined by the following claims.

What is claimed is:

1. A method for quantizing fuel dilution of a supply of engine motor oil in a lubrication system of an internal combustion engine due to post-injection of fuel into a cylinder of the engine that occurs after a main injection to create rich exhaust leaving the cylinder, the method comprising:

in a data processing system associated with the engine, executing an algorithm for a) calculating a quantity of post-injected fuel that is retained in a film of engine motor oil on a wall of the cylinder and that, as a consequence of such retention and continuing operation of the engine, is returned to the engine motor oil supply, the algorithm comprising processing various data including data indicative of the quantity of post-injected fuel, data indicative of in-cylinder pressure at some point in the engine cycle that bears on the quantity of post-injected fuel retained in the film, data indicative of in-cylinder temperature at some point in the engine cycle that bears on the quantity of post-injected fuel retained in the film, and data indicative of engine speed, and b) using the calculated quantity of post-injected fuel that is retained in the film to quantize fuel dilution of the engine motor oil supply.

2. A method as set forth in claim 1 wherein the execution of the algorithm comprises using the data indicative of in-cylinder pressure and the data indicative of in-cylinder temperature to select from a look-up table containing data values, each correlated with a respective set of values of in-cylinder pressure data and in-cylinder temperature data, a data value correlated with the data indicative of in-cylinder pressure and the data indicative of in-cylinder temperature, and using the data value selected from the look-up table, the data indicative of the quantity of post-injected fuel, and the data indicative of engine speed to calculate the quantity of post-injected fuel that is returned to the engine motor oil supply as a consequence of being retained in the film of engine motor oil on the wall of the cylinder.

3. A method as set forth in claim 2 wherein the execution of the algorithm further comprises updating a data value quantizing fuel dilution of the engine motor oil supply by processing data indicative of temperature of the engine motor oil supply at a location external to the cylinder and a correlation function that correlates fuel evaporation from the engine motor oil supply with engine motor oil temperature at the location external to the cylinder to calculate a quantity of evaporative fuel from the engine motor oil supply, and adding to an earlier data value that quantizes fuel dilution of the engine motor oil supply, the difference between the calculated quantity of evaporative fuel from the engine motor oil supply and the calculated quantity of fuel returned to the engine motor oil supply as a consequence of being retained in the film of engine motor oil on the wall of the cylinder.

4. A method as set forth in claim 1 further including initiating execution of the algorithm in response to a request to regenerate an aftertreatment device in an exhaust system through which exhaust from the cylinder passes.

5. A method as set forth in claim 1 further including initiating execution of the algorithm in response to a request to regenerate a diesel particulate filter in an exhaust system through which exhaust from the cylinder passes.

6. An algorithm for calculating a quantity of post-injected fuel that is retained in a film of engine motor oil on a wall of a cylinder of an internal combustion engine into which fuel is injected and that, as a consequence of such retention and continuing operation of the engine, is returned to a supply of engine motor oil in a lubrication system of the engine, the algorithm comprising processing various data including data indicative of engine speed, data indicative of in-cylinder pressure at some point in the engine cycle bearing on the quantity of post-injected fuel retained in the film of engine motor oil that is returned to the engine motor oil supply, data indicative of in-cylinder temperature at some point in the engine cycle bearing on the quantity of post-injected fuel retained in the film of engine motor oil that is returned to the engine motor oil supply, and data indicative of the quantity of post-injected fuel.

7. An algorithm as set forth in claim 6 comprising using the data indicative of in-cylinder pressure and the data indicative of in-cylinder temperature to select from a look-up table containing data values, each correlated with a respective set of values of in-cylinder pressure data and in-cylinder temperature data, a data value correlated with the data indicative of in-cylinder pressure and the data indicative of in-cylinder temperature, and using the data value selected from the look-up table, the data indicative of the quantity of post-injected fuel, and the data indicative of engine speed to calculate the quantity of fuel that is returned to the engine motor oil supply as a consequence of being retained in the film of engine motor oil on the wall of the cylinder.

8. A method as set forth in claim 7 wherein the algorithm further comprises updating a data value quantizing fuel dilution of the engine motor oil supply by processing data indicative of temperature of the engine motor oil supply at a location external to the cylinder and a correlation function that correlates fuel evaporation from the engine motor oil supply with engine motor oil temperature at the location external to the cylinder to calculate a quantity of evaporative fuel from the engine motor oil supply, and adding the difference between the calculated quantity of evaporative fuel from the engine motor oil supply and the calculated quantity of fuel returned to the engine motor oil supply as a consequence of being retained in the film of engine motor oil on the wall of the cylinder to an earlier data value quantizing fuel dilution of the engine motor oil supply.

* * * * *